(12) United States Patent
Skinner et al.

(10) Patent No.: US 9,947,298 B2
(45) Date of Patent: *Apr. 17, 2018

(54) VARIABLE COMPRESSION MANAGEMENT OF MEMORY FOR STORING DISPLAY DATA

(71) Applicants: Colin Skinner, Cambridge (GB); Timothy Mark Edmonds, Cambridge (GB); Martin Andrew Turnock, Cambridge (GB)

(72) Inventors: Colin Skinner, Cambridge (GB); Timothy Mark Edmonds, Cambridge (GB); Martin Andrew Turnock, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/654,482

(22) PCT Filed: Dec. 13, 2013

(86) PCT No.: PCT/GB2013/053292
§ 371 (c)(1),
(2) Date: Jun. 19, 2015

(87) PCT Pub. No.: WO2014/096791
PCT Pub. Date: Jun. 26, 2014

(65) Prior Publication Data
US 2016/0196804 A1     Jul. 7, 2016

(30) Foreign Application Priority Data

Dec. 21, 2012   (GB) .................................. 1223329.2

(51) Int. Cl.
*G09G 5/373*     (2006.01)
*G06F 3/14*      (2006.01)
(Continued)

(52) U.S. Cl.
CPC ........... *G09G 5/373* (2013.01); *G06F 3/1415* (2013.01); *G06F 3/1462* (2013.01); *G09G 5/14* (2013.01);
(Continued)

(58) Field of Classification Search
None
See application file for complete search history.

(56) References Cited

U.S. PATENT DOCUMENTS

| 4,394,774 A | * | 7/1983 | Widergren | ........... | H04N 11/044 |
| | | | | | 341/51 |
| 4,823,108 A | * | 4/1989 | Pope | ........................ | G09G 5/14 |
| | | | | | 345/536 |

(Continued)

FOREIGN PATENT DOCUMENTS

| CN | 1567375 A | 1/2005 |
| CN | 1567375 A | 1/2005 |

(Continued)

OTHER PUBLICATIONS

VESA: "VESA Net2Display Remoting Standard", VESA Net2Display Standard No. Version 1, Oct. 22, 2009 (Oct. 22, 2009), pp. 1-276, XP007917342, pp. 115, 128 p. 131-p. 132 pp. 136, 144.

*Primary Examiner* — Hilina K Demeter
(74) *Attorney, Agent, or Firm* — AEON Law, PLLC; Adam L. K. Philipp; Jonathan E. Olson (57) ABSTRACT

A method, at a host device (10), of managing memory (28) of a display control device (16), the memory (28) being used for storing display data sent from the host device (10) to the display control device (16) for display. The method involves (Continued)

maintaining a map (18) at the host device (10) corresponding to the memory (28) at the display control device, the map (18) indicating locations corresponding to addresses of the memory (28) at which data is stored or not. The map (18) is used to determine a size of a portion of the display data, and a location on the map (18) where the portion of display data would fit into the memory. An address in the memory (28) corresponding to the determined location on the map (18), together with the portion of display data, is then sent to the display control device (16), and the location on the map (18) corresponding to the address in the memory (28) is updated to indicate that the address has data stored in it. The data may be compressed using compression parameters, which can be selected so that the compressed portion of display data will fit into a free space in the memory (28) of the display control device (16).

24 Claims, 7 Drawing Sheets

(51) Int. Cl.
| | | |
|---|---|---|
| *G09G 5/14* | (2006.01) | |
| *G09G 5/393* | (2006.01) | |
| *H04N 19/124* | (2014.01) | |
| *H04N 19/156* | (2014.01) | |
| *H04N 19/174* | (2014.01) | |
| *G09G 5/36* | (2006.01) | |
| *G09G 5/397* | (2006.01) | |

(52) U.S. Cl.
CPC ............. *G09G 5/363* (2013.01); *G09G 5/393* (2013.01); *G09G 5/397* (2013.01); *H04N 19/124* (2014.11); *H04N 19/156* (2014.11); *H04N 19/174* (2014.11); *G09G 2340/02* (2013.01); *G09G 2360/18* (2013.01); *G09G 2370/025* (2013.01); *G09G 2370/042* (2013.01)

(56) References Cited

U.S. PATENT DOCUMENTS

| | | | | |
|---|---|---|---|---|
| 5,131,080 A * | 7/1992 | Fredrickson | ........ | G06F 12/0875 345/545 |
| 5,159,678 A * | 10/1992 | Wengelski | ................ | G06F 8/41 711/153 |
| 5,170,468 A * | 12/1992 | Shah | ..................... | G06T 15/405 345/537 |
| 6,366,289 B1 * | 4/2002 | Johns | ..................... | G06F 12/023 345/543 |
| 7,386,663 B2 * | 6/2008 | Cousins | ............ | G06F 17/30067 711/114 |
| 7,979,403 B2 * | 7/2011 | Kedem | ................. | G06F 3/0608 707/693 |
| 8,619,866 B2 * | 12/2013 | Zhou | ..................... | H04N 19/426 345/543 |
| 2004/0234138 A1 | 11/2004 | Hsieh | | |
| 2006/0101223 A1 * | 5/2006 | Lekatsas | ............. | G06F 12/0802 711/173 |
| 2008/0259089 A1 * | 10/2008 | Matsubara | .......... | G06F 12/0862 345/545 |
| 2009/0052873 A1 | 2/2009 | Miyagoshi | | |
| 2009/0278845 A1 * | 11/2009 | Kato | ..................... | G06T 15/005 345/420 |
| 2010/0020868 A1 | 1/2010 | Ayres, Jr. et al. | | |
| 2011/0080950 A1 | 4/2011 | Toyota et al. | | |
| 2011/0106769 A1 * | 5/2011 | Baptist | ................ | G06F 11/1004 707/652 |
| 2011/0141133 A1 * | 6/2011 | Sankuratri | ............ | G06F 3/1454 345/600 |
| 2011/0299588 A1 | 12/2011 | Zhou et al. | | |
| 2014/0267335 A1 * | 9/2014 | Stoye | .................... | G06F 3/1423 345/545 |
| 2015/0310642 A1 * | 10/2015 | Kruglick | .............. | H04N 21/235 345/441 |

FOREIGN PATENT DOCUMENTS

| | | |
|---|---|---|
| CN | 100499758 C | 6/2009 |
| CN | 100499758 C | 6/2009 |
| CN | 101827199 A | 9/2010 |
| CN | 101827199 A | 1/2018 |
| EP | 1918766 A2 | 10/2008 |
| EP | 1978766 A2 | 10/2008 |
| EP | 2023252 A1 | 2/2009 |
| EP | 2498492 A1 | 9/2012 |
| EP | 2498492 A1 | 9/2012 |
| GB | 2485613 A | 5/2012 |
| JP | 08110943 A | 4/1996 |
| JP | 08194642 A | 7/1996 |
| JP | 2003101547 A | 4/2003 |
| JP | 2003101547 A | 4/2003 |
| JP | 2003235025 A | 8/2003 |
| JP | 2003235025 A | 8/2003 |
| KR | 20010057947 A | 7/2001 |

\* cited by examiner

VARIABLE COMPRESSION MANAGEMENT OF MEMORY FOR STORING DISPLAY DATA

The present invention relates to methods and apparatus for managing memory for storing display data, and more particularly, though not exclusively, for managing a memory storing compressed display data at a display control device.

In desktop computing, it is now common to use more than one display device. Traditionally, a user would have a computer with a single display device attached, but now it is possible to have more than one display device attached to the computer, which increases the usable area for the worker. For example, International Patent Application Publication WO 20071020408 discloses a display system which comprises a plurality of display devices, each displaying respectively an image, a data processing device connected to each is display device and controlling the image displayed by each display device, and a user interface device connected to the data processing device. Connecting multiple display devices to a computer is a proven method for improving productivity.

The connection of an additional display device to a computer presents a number of problems. In general, a computer will be provided with only one video output such as a VGA-out connection. One method by which a display device can be added to a computer is by adding an additional graphics card to the internal components of the computer. The additional graphics card will provide an additional video output which will allow the display device to be connected to the computer and driven by that computer.

However, this solution is relatively expensive and is not suitable for many non-technical users of computers.

An alternative method of connecting a display device is to connect the display device to a USB socket on the computer, as all modern computers are provided with multiple USB sockets. This provides a simple connection topology, but requires additional hardware and software to be present, as in general, USB has a bandwidth that makes the provision of a good quality video output a non-trivial task. It is also desirable that any additional hardware between the computer and the display device is kept as simple as possible. This means that when connecting a display device using a limited bandwidth technology such as USB, certain complex tasks can be difficult to achieve. In particular, a display control device needs to present that can receive the USB input and provide a suitable output to the display device.

As display technologies improve and the user's desire for display quality increases, the requirement placed upon the display control device that is receiving the incoming display data will correspondingly increase, as the amount of display data will increase proportionally. It is obviously desirable that any new display control devices can is handle higher definition video inputs and higher resolution display devices, so the ability to produce a high performance display control device at as low a cost as possible is highly desirable.

GB 2485613 discloses a display control device that comprises a frame buffer store and a control component. The display control device is arranged to receive compressed display data, store the received compressed display data in the frame buffer store, and for each frame refresh of the display device access the stored compressed display data, decompress the accessed display data, and output the decompressed display data. Thus, the compressed data is stored in the frame buffer store without first being decompressed in the display control device.

Management of such a frame buffer store is needed, whether or not the display data is compressed. In order to keep the display control device costs as low as possible, it is therefore desirable that the computer, or host processing device, cooperate with the display control device to help in the management of the memory of the display control device. Therefore, aspects and examples of the invention are set out in the claims and address at least a part of the above described problem.

Examples of the invention may be implemented in software, middleware, firmware or hardware or any combination thereof. Embodiments of the invention comprise computer program products comprising program instructions to program a processor to perform one or more of the methods described herein, such products may be provided on computer readable storage media or in the form of a computer readable signal for transmission over a network. Embodiments of the invention provide computer readable storage media and computer readable signals carrying data structures, media data files or databases according to any of those described herein.

Apparatus aspects may be applied to method aspects and vice versa. The skilled reader will appreciate that apparatus embodiments may be adapted to implement features of method embodiments and that one or more features of any of the embodiments described herein, whether defined in the body of the description or in the claims, may be independently combined with any of the other embodiments described herein.

In a first aspect the invention provides a method, at a host device, of managing variable size memory of a display control device connectable to the host device, the memory being used for storing display data sent from the host device to the display control device for displaying on a display, the method comprising:
  maintaining a map at the host device corresponding to the memory of the display control device, the map indicating locations corresponding to addresses of the memory at which data is stored or not;
  determining a size of a portion of the display data, the size being variable for different portions of data;
  determining a location on the map where the portion of display data would fit into the memory;
  sending, to the display control device, an address in the memory corresponding to the determined location on the map, together with the portion of display data; and
  updating the location on the map corresponding to the address in the memory to indicate that the address has data stored in it.

Preferably, the method further comprises determining free space available in the memory based on the map.

The memory preferably comprises a frame buffer memory for storing a frame of image data.

In one embodiment, the method further comprises compressing the portion of a frame of display data using compression parameters.

The method may further comprise selecting the compression parameters so that the compressed portion of display data will fit into a free space in the frame buffer memory of the display control device.

The compression parameters are preferably selected so that the compressed portion of display data has an optimum quality.

Selecting compression parameters so that that the compressed portion of display data has an optimum quality preferably comprises determining that the compression is too high and selecting compression parameters to reduce the compression, The selected compression parameters preferably comprise quantisation parameters.

In one embodiment, the method further comprises determining, based on the map, whether the frame buffer memory of the display control device is expected to run out of space before all the display data of a current frame is compressed and sent, and if it is determined that the frame buffer memory of the display control device is expected to run out of space before all the display data of the current frame is compressed and sent, adjusting the compression parameters in order to increase the compression of the display data so that all remaining compressed display data of the current frame will fit into the frame buffer memory.

The adjusted compression parameters preferably comprise quantisation parameters.

The map may corresponds to two or more frame buffers in the frame buffer memory at the display control device. The frame buffers may be of equal or unequal size.

The host device preferably sends to the display control device information regarding an order in which the portions of display data in the memory are to be accessed from the memory and combined to display an image on the display.

According to a second aspect, the invention provides a method, at a host device, of managing a random access memory of a display control device connectable to the host computing device, the memory being used for storing compressed display data forming parts of an image sent from the host device to the display control device, wherein the display control device decompresses the compressed display data from the memory for displaying on a display, the method comprising:
  determining free space available in the random access memory;
  selecting compression parameters so that a compressed portion of display data will fit into a free space in the random access memory of the display control device;
  compressing a predetermined portion of a frame of display data;
  sending, to the display control device, an address in the memory corresponding to the determined free space in the memory, together with the compressed portion of display data; and
  sending, to the display control device, information regarding an order in which the portions of compressed display data in the memory are to be decompressed and combined to display the image on the display.

In an embodiment, the method further comprises determining whether the memory of the display control device is expected to run out of space before all the display data of a current frame is compressed and sent, and if it is determined that the memory of the display control device is expected to run out of space before all the display data of a current frame is compressed and sent, selecting different compression parameters in order to increase the compression of the display data so that all remaining compressed display data of the current frame will fit into the memory.

The method may further comprise:
  selecting compression parameters so that the portion of display data has an optimum quality when it has been compressed;
Preferably, selecting compression parameters so that the compressed portion of display data has an optimum quality comprises determining that the compression is too high and selecting compression parameters to reduce the compression, In a third aspect, the invention provides a method, at a host device, of managing a random access memory of a display control device connectable to the host device, the memory being used for storing compressed display data forming parts of an image sent from the host device to the display control device, wherein the display control device decompresses the compressed data from the memory for displaying on a display, the method comprising:
  determining free space available in the memory;
  determining whether the memory is expected to run out of space before all the display data of a current frame is compressed and sent;
  selecting compression parameters so that all remaining compressed display data of the current frame will fit into the memory;
  compressing a predetermined portion of a frame of display data;
  sending, to the display control device, the compressed portion of display data; and
  sending, to the display control device, information regarding an order in which the portions of compressed display data in the frame buffer memory are to be decompressed and combined to display the image on the display.

The method preferably further comprises maintaining a map at the host device corresponding to the memory of the display control device, the map indicating locations corresponding to addresses of the memory at which data is stored or not.

Preferably, determining free space available in the memory comprises determining a location on the map where the compressed portion of display data would fit into the memory.

The method may further comprise updating the location on the map corresponding to the address in the memory to indicate that the address has data stored in it.

The map preferably corresponds to two or more frame buffers in the memory at the display control device. The frame buffers may be of equal or unequal size.

In an embodiment, the method further comprises selecting the compression parameters so that a frame of display data has an optimum quality when it has been compressed that can be sent from the host computing device in a target time.

The method preferably further comprises selecting the compression parameters so that the portion of data can be sent from the host device in a target time. The target time may be chosen to be less than a predetermined period.

In an embodiment, the method further comprises selecting the compression parameters so that a frame of display data has an optimum quality when it has been compressed that can be sent from the host computing device based on resources available to transmit the compressed data to the display control device.

Preferably, if it is determined that the compressed portion of display data will not fit efficiently into the memory, then all previous portions of display data for the frame are compressed again using different compression parameters to produce smaller portions of compressed data for sending to the display control device for storing in the memory replacing the previously sent compressed portions of display data for the frame. The different compression parameters may comprise quantisation parameters.

In a further aspect, the invention provides a method, at a host device, of managing a memory of a display control device connectable to the host device, the memory being used for storing compressed display data sent from the host device to the display control device, wherein the display control device decompresses the compressed data from the memory for displaying on a display, the method comprising:
- selecting compression parameters so that a frame of display data has an optimum quality when it has been compressed that can be sent from the host computing device in a target time;
- compressing the predetermined portion of display data using the selected compression parameters;
- sending the compressed portion of display data to the display control device.

According to a still further aspect, the invention provides a method, at a host device, of managing a memory of a display control device connectable to the host computing device, the memory being used for storing compressed display data sent from the host device to the display control device, wherein the display control device decompresses the compressed data from the memory for displaying on a display, the method comprising:
- selecting compression parameters so that a frame of display data has an optimum quality when it has been compressed that can be sent from the host device based on resources available to transmit the compressed data to the display control device;
- compressing the predetermined portion of display data using the selected compression parameters;
- sending the compressed portion of display data to the display control device.

In another aspect, the invention provides a method, at a host device, of managing a memory of a display control device connectable to the host device, the memory being used for storing compressed display data sent from the host device to the display control device, wherein the display control device decompresses the compressed data from the memory for displaying on a display, the method comprising:
- selecting compression parameters so that a portion of a frame of compressed data can be sent from the host device in a target time;
- compressing the predetermined portion of display data using the selected compression parameters;
- sending the compressed portion of display data to the display control device.

The target time preferably may be chosen to be less than a predetermined period.

Preferably, selecting the compression parameters is based on a time taken for a previous frame of compressed data sent from the host device.

Selecting the compression parameters may be based on content of a previous frame of compressed data sent from the host device.

According to yet another aspect, the invention provides a method, at a host device, of managing a memory of a display control device connectable to the host device, the memory being used for storing compressed display data sent from the host device to the display control device, wherein the display control device decompresses the compressed data from the memory for displaying on a display, the method comprising:
- maintaining a map at the host device corresponding to the memory of the display control device, the map indicating quality of portions of the display data stored at particular addresses in the memory;
- determining when the quality of a portion of the display data previously sent to the display control device was of low quality;
- determining that resources are available to transmit the compressed portion of display data to the display control device in a higher quality;
- selecting compression parameters so that the portion of the display data is of higher quality when it has been compressed;
- compressing the portion of display data using the selected compression parameters;
- sending the compressed portion of display data to the display control device; and
- updating the quality on the map corresponding to the address in the memory where the portion of compressed display data having higher quality is stored.

The compressed portion of data is preferably packaged with a transport protocol before being sent to the display control device. The transport protocol may be an Internet Protocol, for example, TCP/IP protocol or USB protocol, or a wireless protocol, for example, WiFi Wireless protocol or WiGig protocol. The compressed portion of data is preferably packaged into a packet for sending to the display control device, the packet including the address, which address may be included in a header of the packet.

In one embodiment, the compressed portion of data comprises a partial update of the display data including only the display data that has changed from the previous frame. The compressed portion of data may comprise a tile of display data or a group of tiles of display data.

In a further aspect, the invention provides a host device configured to perform a method as described above.

In a further aspect, the invention provides a method, at a display control device connectable to a host device, of storing display data sent from the host device to the display control device in a memory for displaying on a display, the method comprising:
- receiving a portion of display data together with an address;
- storing the portion of display data at the address in the memory;
- receiving information regarding an order in which the portions of display data in the memory are to be accessed from the memory and combined to display an image on the display;
- accessing the portions of display data from the memory; and
- combining the accessed portions of display data to form an image for display.

Preferably, the memory comprises a frame buffer memory for storing a frame of image data.

The received portion of display data may be a compressed portion of display data. Preferably, the method further comprises decompressing the compressed portion of display data from the memory prior to combining the portions to form the image.

In a further aspect, the invention provides a display control device configured to perform a method as described above.

In a still further aspect, the invention provides a computer readable medium including executable instructions which, when executed in a processing system, cause the processing system to perform a method as described above.

Another aspect of the invention provides a display system comprising:
- a host device configured to perform a method as described above;
- a display control device configured to perform a method as described above; and a display coupled to the display control device and configured to display the image.

A still further aspect of the invention provides a display control device connectable to a host device and a display, the display control device comprising a random access memory for storing compressed display data received from the host device, a decompressor for decompressing the compressed display data from the random access memory for rasterising for output to the display, and a non-volatile programmable memory for storing compressed image data, wherein the decompressor decompresses the compressed image data for rasterising for output to the display when it is not required to display the compressed display data from the random access memory.

Embodiments of the invention will now be described in greater detail, by way of example only, with reference to the accompanying drawings, in which.

Figure 1:
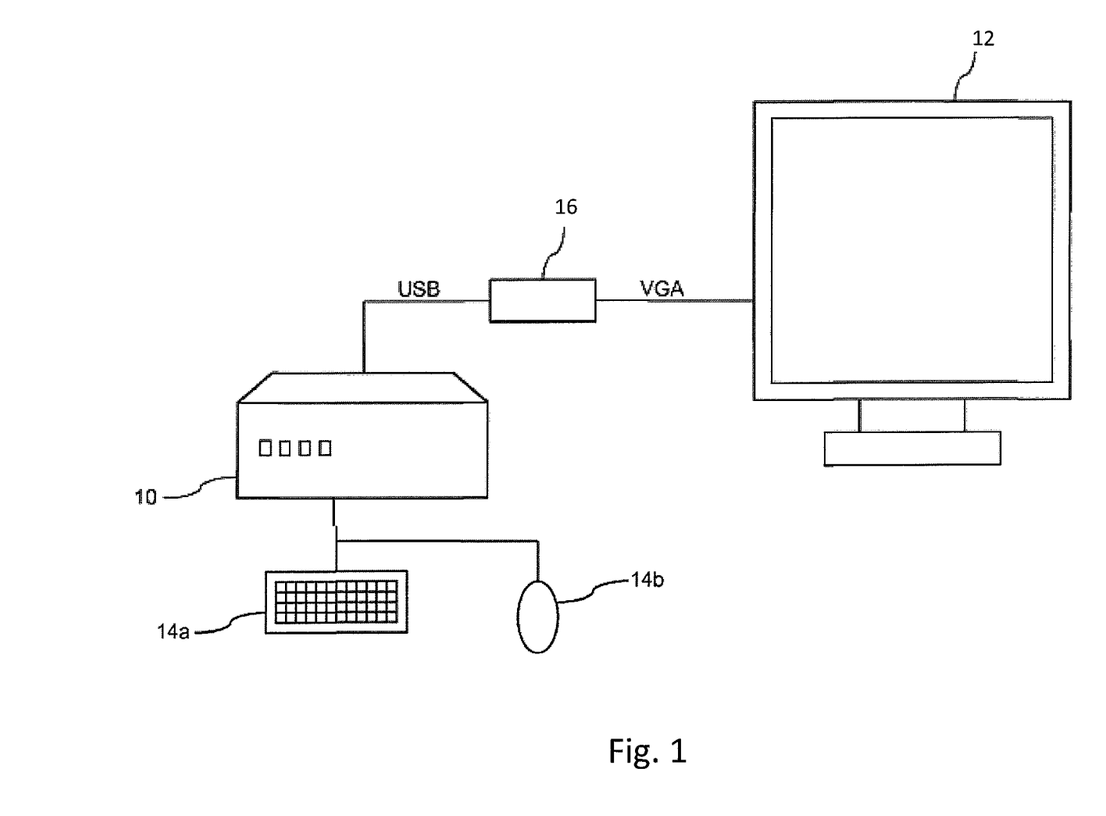
FIG. 1 shows a schematic diagram of components of a display system.

A display system is shown in FIG. 1. The system comprises a host processing device 10, a display device 12 and user interface devices 14. The user interface devices are a keyboard 14a and a mouse 14b. The system shown in FIG. 1 is a standard desktop computer, with a display device 12, which is composed of discrete components that are locally located but could equally be a device such as a laptop computer or suitably enabled handheld device such as a mobile phone or pda (personal digital assistant) all using an additional display. Similarly, the system may comprise part of a networked or mainframe computing system, in which case the processing device 10 may be located remotely from the user input devices 14 and the display device 12, or indeed may have its function distributed amongst separate devices.

The display device 12 shows images, and the display of the images is controlled by the processing device 10. One or more applications are running on the processing device 10 and these are represented to the user by corresponding application windows, with which the user can interact in a conventional manner. The user can control the movement of a cursor about the images shown on the display device 12 using the computer mouse 14b, again in a totally conventional manner. The user can perform actions with respect to any running application via the user interface device 14 and these actions result in corresponding changes in the images displayed on the display device 12.

The operating system run by the processing device 10 uses virtual desktops to manage the or multiple display devices 12. The physical display device 12 is represented by a frame buffer that contains everything currently shown on that display device 12. In order to allow the display device to be connected to a USB port on the processing device 10, rather than the standard FGA port, as would be the case if the display device 12 is a secondary display device, the processing device 10 connects to the secondary display device 12 via a display control device 16. The display control device 16 is connected to the processing device 10 via a standard USB connection, and appears to the processing device 10 as a USB connected device. Any communications between the processing device 10 and the display control device 16 are carried out under the control of a USB driver specifically for the display control device 16. Such devices allow the connection of the secondary display device 12 to the processing device 10 without the need for any hardware changes to the processing device 10.

The display control device 16 connects to the display device 12 via a standard VGA connection, and the display device 12 is a conventional display device 12 which requires no adjustment to operate in the display system shown in FIG. 1. As far as the display device 12 is concerned, it could be connected directly to the graphics card of a processing device; it is unaware that the graphical data displayed by the display device 12 has actually been first sent via a USB connection to an intermediate component, the display control device 16. Multiple additional display devices 12 can be is connected to the processing device 10 in this way, as long as suitable USB slots are available on the processing device 10.

The display control device 16 is external to the processing device 10 and is not a graphics card. It is a dedicated piece of hardware that receives graphical data via the USB connection from the processing device 10 and transforms that graphics data into a VGA format that will be understood by the display device 12. In topological terms USB and VGA are only examples of data standards that can be used to connect the additional display device 12 to the processing device 10. The general principle is that a general-purpose data network (such as USB or Ethernet) connects the processing device 10 to the display control device 16 and a display-specific data standard (such as VGA or DVI) is used on the connection from the display control device 16 to the display device 12.

Figure 2:
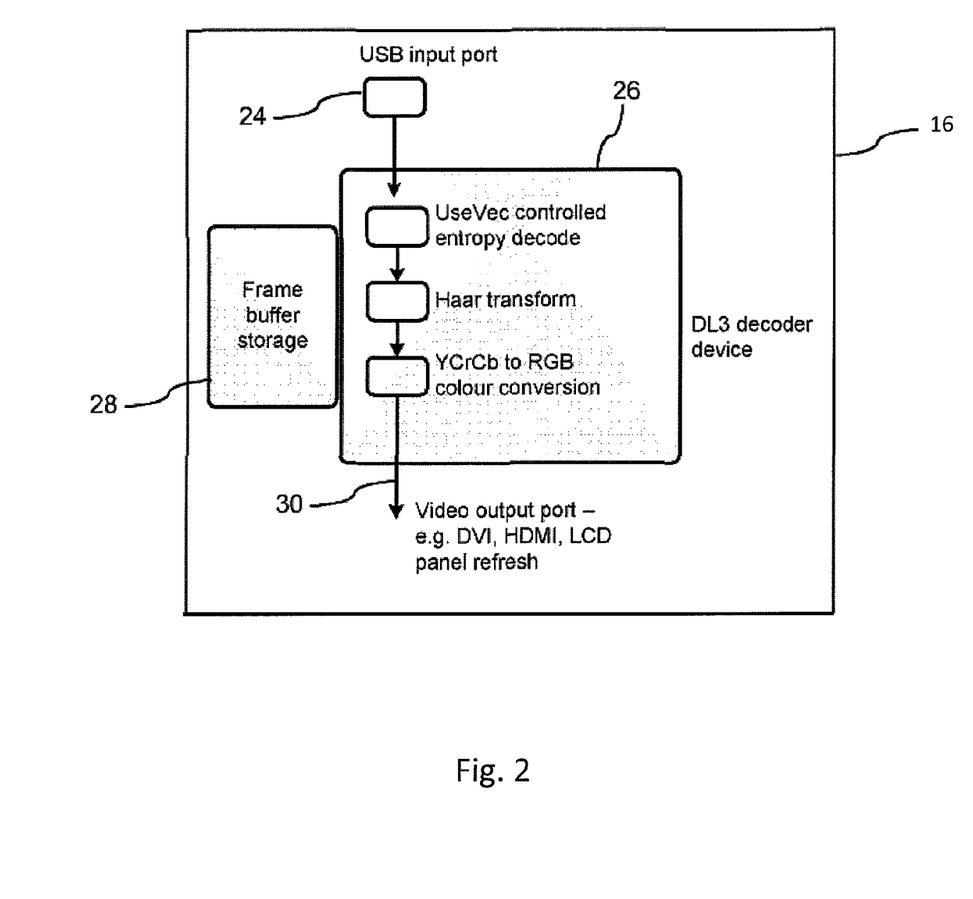
FIG. 2 shows a schematic diagram of a display control device used in the display system of FIG. 1.

The display control device 16 is shown in more detail in FIG. 2. The device 16 operates to receive encoded display data via a USB input port 24, which is processed with a processor 26 that is connected to a frame buffer 28 and provides an output via an output port 30. The device 16 is for generating the image that is displayed by the display device 12. The device 16 is effectively an image decoder, as it receives encoded display data which is then decoded to pixel data that is stored within the frame buffer 28.

The display control device 16 is a lightweight piece of hardware for adding an additional display 12 to a computer 10.

The incoming signal received by the USB input port 24 comprises encoded display data for one or more pixel tiles or groups of pixel tiles within the image to be displayed and also position data for each of the pixel tiles or groups of pixel tiles in the image. It will be appreciated that the image can be subdivided into any portion of display data that is less than the display data for an entire image, and reduces the amount of data that has to be transmitted between the computer 10 and the display control device 16. A pixel tile comprises an 8×8 array of pixels and the group size could be sixteen pixel tiles, for example, in a 4×4 array of tiles. However, any appropriate portion, or atom, of display data could be used. Often, only an update of part of the image is being sent.

The processor 26 takes the encoded tiles and decodes these tiles into pixel data and updates the frame buffer 28 with the new decoded pixel data is according to the position data in the received signal. In this way, the frame buffer 28 will always maintain pixel data for the entire image, and this pixel data is continuously being updated by the processor 26. The processor 26 will then output at least a portion of the frame buffer contents via the output port 30 to the display device 12 over the VGA connection. The display control device 16 is configured as a dedicated piece of hardware for the decoding process.

In a preferred embodiment, the video decoding device (embodied as a silicon chip or an end user product) receives an encoded video signal, decodes the video signal, and outputs the decoded signal to a video display device over a video link such as HDMI, DVI, DP, such that the encoded signal arrives over some variant of the USB interface as standardised by the USB-IF, and the encoded signal makes use of the Haar transform for each 8×8 pixel square of the source images, in each colour channel, AC coefficients of each Haar transform are encoded as variable length bit fields, where the variable encoding is defined using a simple and compact UseVec form (consistent with the definition in the background section). The AC coefficients are ordered so that trailing coefficients represent highest-frequency data, and trailing zero coefficients may be omitted; the colour channels are all at the same resolution, with no subsampling of chroma channels being performed, except as dynamically determined by the number of coefficients provided to the Haar transforms. The encoded signal format is divided into groups of 8×8 tiles so that partial updates of video frame may be performed. Each tile group separately identifies its intended location in the displayed image so that local changes to not require a complete frame update. Each tile group contains fewer than twenty 8×8 tiles and the decoded signal is sent to a video raster display port such as HDMI, DVI, DisplayPort, or is displayed directly on a is visual display which forms part of the device.

FIG. 2 shows one embodiment of the display control device 16, which includes a dedicated frame buffer 28 provided by, for example Random Access Memory (RAM). In other solutions, the frame buffer 28 may not be part of the device 16, but may be present on another separate chip, in which case the processor 26 writes to that frame buffer 28 via a suitable external output port. The device 16 may not be a separate device as shown in FIG. 1, but may form part of the actual display device 12. In this case, the output device 30 is not an output port as such, but is the actual display device 12, which is written directly from the frame buffer 28.

As mentioned above, the frame buffer 28 stores portions of data that, together, form the complete image. Position data that is sent indicates to the processor 26 the position of the portions of data within the image, so that, when they are decoded, the complete image can be formed.

Figure 3:
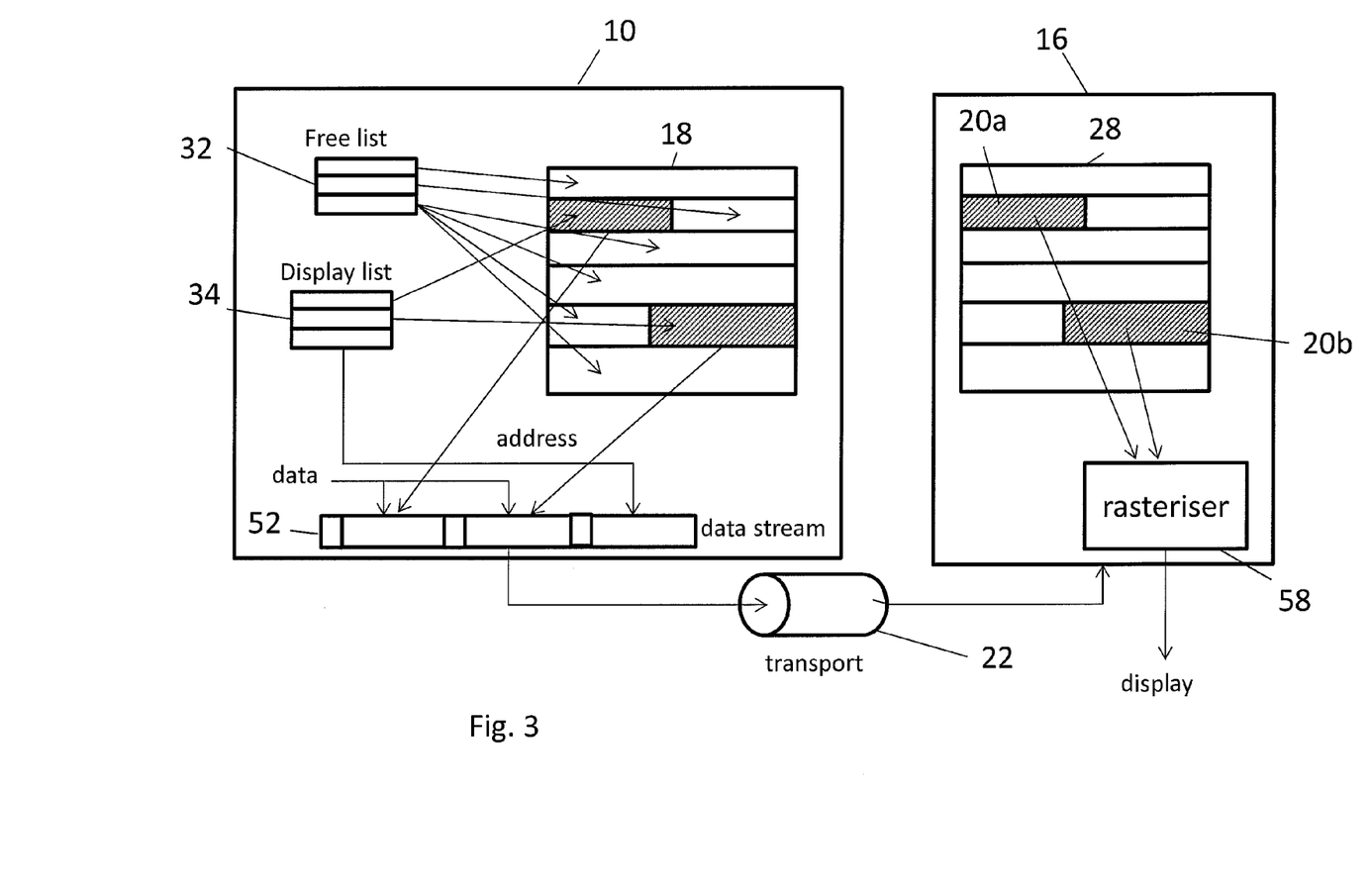
FIG. 3 shows a schematic diagram of one embodiment of a buffer memory management system used in the display system of FIG. 1.

Nevertheless, managing the frame buffer 28 in order to make efficient use of its memory space, is required. As shown in FIG. 3, the frame buffer 28 includes space for a number of different portions 20 of display data. The portions 20 may be of different sizes, as shown, particularly if they constitute updates of part of the image. It is therefore desirable that the different sized portions are efficiently packed into the frame buffer 28, so that the least amount of space is wasted between different portions 20. For example, the portion of data 20*b* would not fit into the space next to portion 20*a*, since it is portion 20*b* is too big for that space. However, another portion of data may fit into that space next to portion 20*a*, and it would be more efficient to store it in that space, rather than on another row in the frame buffer 28.

As shown in FIG. 3, in one embodiment, the processing device 10 (the host device), is arranged to include a map 18 corresponding to the frame buffer 28. The map is updated to indicate where, in the frame buffer 28, portions 20 of display data have been stored, so that the processing device 10 can best determine where to store further portions 20 of display data. The processing device 10, where the portions of data are encoded, and/or compressed, determines the size of the portion of data to be sent to the device 16 for storage in the frame buffer 28, the size being variable for different portions 20 of data. The processing device then determines a location on the map 18 where the portion 20 of data would fit in the frame buffer 28. For example, the processing device 10 may maintain a free space list 32, in which the free spaces in the map 18 are included, together with the sizes of the free spaces. The processing device 10 can then easily determine which is the smallest free space into which the portion of data can fit, thereby maximising the packing efficiency. The address in the frame buffer 28 corresponding to that location in the map 18 is then sent to the display control device 16, together with the portion of data, via a transport mechanism 22 and the location on the map 18 is updated to indicate that the corresponding address(es) in the frame buffer 28 are now full. The transport mechanism 22 can be any appropriate transport protocol for transferring the display data, and can include packaging the portions of display data into packets, together with the addresses (and other information), as required.

As mentioned above, the processing device 10 also maintains a list 34 of the portions of data with the order in which they are to be accessed to form the image to be displayed. The list 34 (or at least the information therein, i.e. the order in which the portions of display data stored at particular addresses in the frame buffer 28 are to be accessed and displayed) is also sent to the device 16. As shown in FIG. 3, the portions of data, together with their assigned addresses, are inserted into a data stream 52, as is the display list 34, for transfer to the transport mechanism 22 for transport to the display control device 16. Therefore, the different portions of the image can then be sent in the correct order to a rasteriser 58 in the display control device 16, from where the image is sent to the display.

It will be appreciated that the display control device may have more than one frame buffer, for example two (or more) frame buffers, which may be provided in the same RAM or in different RAMs. In such a case, of course, the map 18 would map all the frame buffers and there would be separate display lists 34 for each frame buffer to provide the display order for each display buffer. Furthermore, the different frame buffers may be the same size or may have different sizes. If desired, a separate map 18 could be provided for each frame buffer, whether or not they are provided in the same or different RAMs. Each frame buffer may store a frame of image data, so that one frame buffer is being read out and displayed while the second frame buffer is being filled with the next image. Furthermore, as mentioned above, the display data may be compressed by the processing device and sent to the display control device in compressed form. The received compressed data can then be stored in the frame buffer without decompression, and the may only be decompressed when needed for display.

Alternatively, the RAM in the display control device may not be specifically separated into individual frame buffers, but may have one or more memory spaces such that different portions of compressed data of different frames can be sent to addresses in the same memory space such that portions of one frame may be mixed up with portions of another frame.

The list 34 sent to the display control device then provides to the display control device the information regarding an order in which the portions of display data in the memory space are to be accessed from the memory space for individual frames and combined to display an image on the display. The display control device can access from the memory the compressed portions of display data for one frame while receiving and storing in the memory compressed portions of display data for another frame.

If desired, the display control device can determine free space available in its memory, and send feedback indicative of the available free space to the host device. The host device then receives the feedback and updates the map based on the feedback.

Alternatively or additionally, if desired, the display control device can determine quality of a previous portion of display data received from the host device, and send feedback indicative of the quality of the previous portion of display data to the host device. The host device then receives the feedback from the display control device regarding quality of a previous portion of display data and updates the map based on the feedback.

In an embodiment, the host device can determine, based on the map, that the display control device memory requires defragmentation, and can send appropriate instructions to the display control device to perform a defragmentation procedure, and can update the map accordingly. The display control device receives the instructions from the host device, and performs a defragmentation of the memory in response to receiving the instructions.

Figure 4:
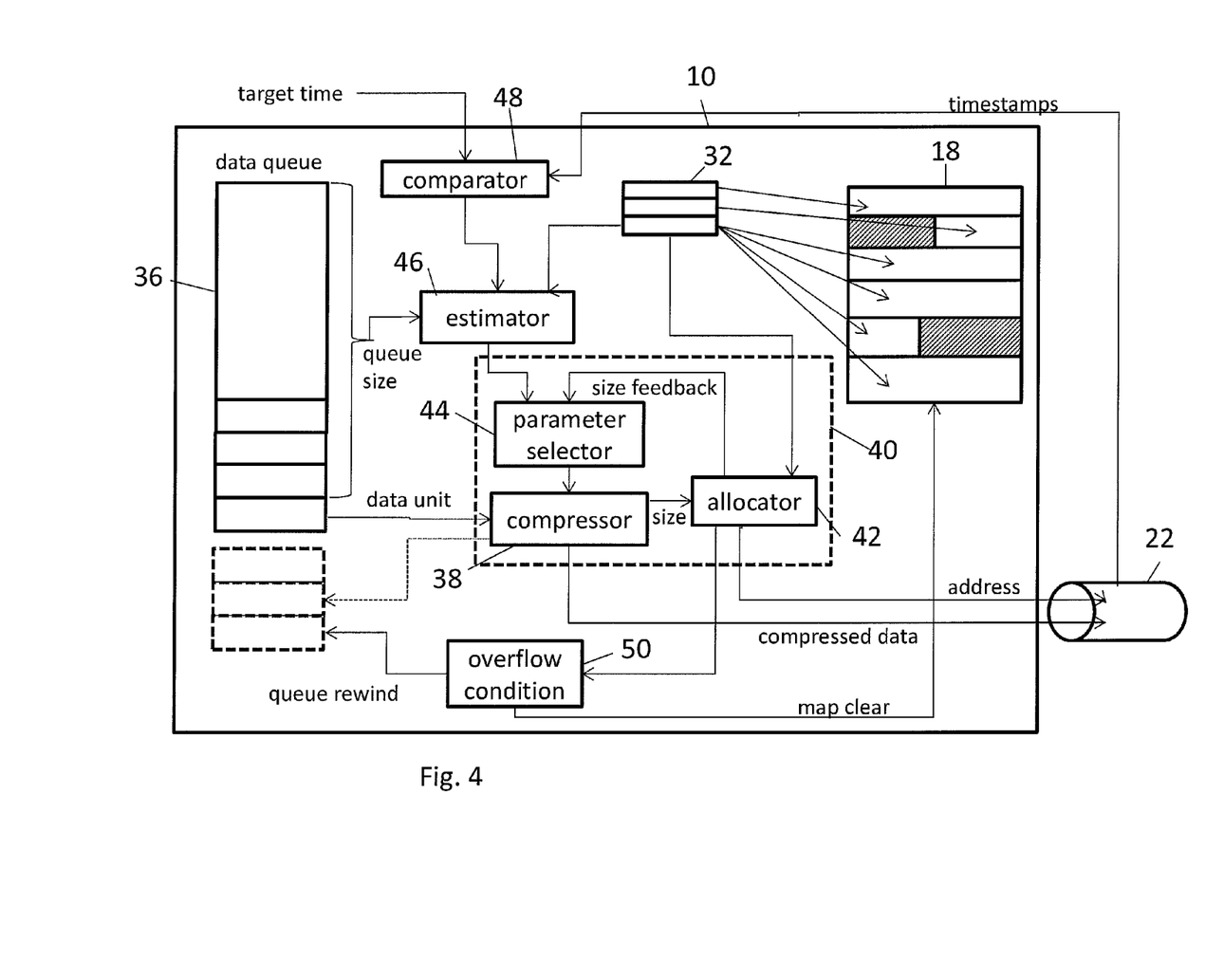
FIG. 4 shows a schematic diagram of part of a processing device used in the buffer memory management system of FIG. 3.

FIG. 4 shows one embodiment of part of the processing device 10 of FIG. 3 in more detail. As can be seen, the data is initially held in a data queue 36, from where individual portions of data are passed to a compressor 38 forming part of a compression unit 40. After compression, the compressed portion of data is passed to the transport mechanism 22 for transfer to the display control device 16. However, as mentioned above, once the portion of data is compressed, the size of the compressed portion of data is passed to an allocator 42, which determines (preferably, but not necessarily, from the map 18, using the free space list 32) which is the best free space into which the portion of data can fit. The address in the frame buffer 28 corresponding to that location in the map 18 is then sent to the display control device 16.

Furthermore, however, the allocator 42 can determines the available free space and can feed the available size of free space back to a parameter selector 44, where compression parameters, such as compression parameters, are selected for the compressor 38 to use in compressing the data portion. In this way, for example, if the compressed portion of data is too large to fit into an available free space, the allocator 42 can pass the size of the available free space back to the parameter selector 44, which can then select different compression parameters and the portion of data can be compressed again, so that the compressed portion of data will fit into the available free space. The parameter selector may also, of course, select the compression parameters so that the compresses portion of data has an optimum quality, and, it is found that that there is more available space than would be used for the size of the compressed portion of data, then the compression parameters can be (re)selected to reduce the compression to increase the quality of the compressed portion of data.

Also shown in FIG. 4 is an estimator 46, which obtains an estimate of the available free space from the map 18 via the free space list 32 and also obtains a size of the data queue 36 still awaiting compression and transfer. The estimator 46 then determines whether the frame buffer 28 has enough space for all the portions of data still in the data queue 36 if they were to be compressed using the normal compression parameters. If the estimator 46 determines that the frame buffer 28 of display control device 16 is expected to run out of space before all the display data of the current frame is compressed and sent, the estimator 46 provides that information to the parameter selector 44 so that the compression parameters can be adjusted in order to increase the compression of the portions of display data so that all remaining compressed display data of the current frame will fit into the frame buffer 28. Again, although the estimate of free space is described as being determined using the map 18, this is not essential, and any way of determining the available free space could be used.

Apart from determining whether the frame buffer 28 has enough space for all the portions of data still in the data queue 36 if they were to be compressed using the normal compression parameters, the estimator 46 can also control the parameter selector to select the compression parameters based on the time taken to send the compressed portion of data. For example, it is often the case that there is a maximum period of time available for a compressed portion of data to be transmitted from the processing device. This period may depend on the physical resources available for the transport mechanism, or may depend on the transport protocol being used. So, for example, a period of 16 ms may be a maximum period available. It is desirable, therefore, to select compression parameters which would reduce the size of the compressed portion of data sufficiently that it could be sent out in a time less than the maximum period. A target time, for example, 14 ms, may therefore be aimed at. A comparator 48 may be used to compare the timestamps from the transport mechanism 22 for previously sent compressed portions of data with the target time, to see whether the target time was being achieved, or whether the actual times for previously sent compressed portions of data were longer or shorter than the target time. Based on that comparison, the estimator 46 can then factor in whether previous compressions were too high or too low to achieve the target time with the optimum quality and can control the parameter selector to select compression parameters accordingly.

It will be appreciated that the target time is the time taken for the processing device 10 to send out the compressed portions of data. Alternatively or additionally, the compression parameters can be selected to achieve the optimum quality based on the time taken for the compressed portions of data to be transmitted across the link from the processing device 10 to the display control device 16. This may depend on the resources available across that link.

The compression parameters may also be selected to make sure that frame buffer is filled in time before the frame buffer needs to be accessed for displaying the frame. For example, the time taken for a previous frame to be sent, transmitted and received may be used to select the compression parameters for the next frame. Furthermore, the compression parameters may also be selected based on the content of the previous frame of data. For example, a frame that comprises text may be compressed less than a frame that comprises video data.

Of course, it is possible that the allocator 42 is not be able to find sufficient free space in the frame buffer 28 for a portion of compressed data, even if it was (re) compressed at a higher compression. If the allocator 42 therefore determines that it cannot allocate space in the frame buffer to the compressed portion of data, it notifies an overflow condition 50, which sends a command to the clear the map 18 and to the data queue 36 to rewind the queue back to the beginning, i.e. to start compressing portions of the frame again. In this case, the parameter selector 44 would select compression parameters from the beginning of the frame to provide a higher compression so that it was more likely that all the frame would fit in the frame buffer. Since the map 18 was cleared, the new compressed portions of data would be allocated any appropriate available space in the frame buffer 28 based on the map 18, and they would, of course, overwrite in the frame buffer 28 anything that was already there. Although this process could be carried out for the existing frame that did not fit, if it were determined that there was not enough time for the frame to be (re)compressed and transmitted to the display control device before it needed to be accessed and displayed, then the frame could be skipped and the next frame could be processed, so that the problem frame was skipped at the display.

Figure 5:
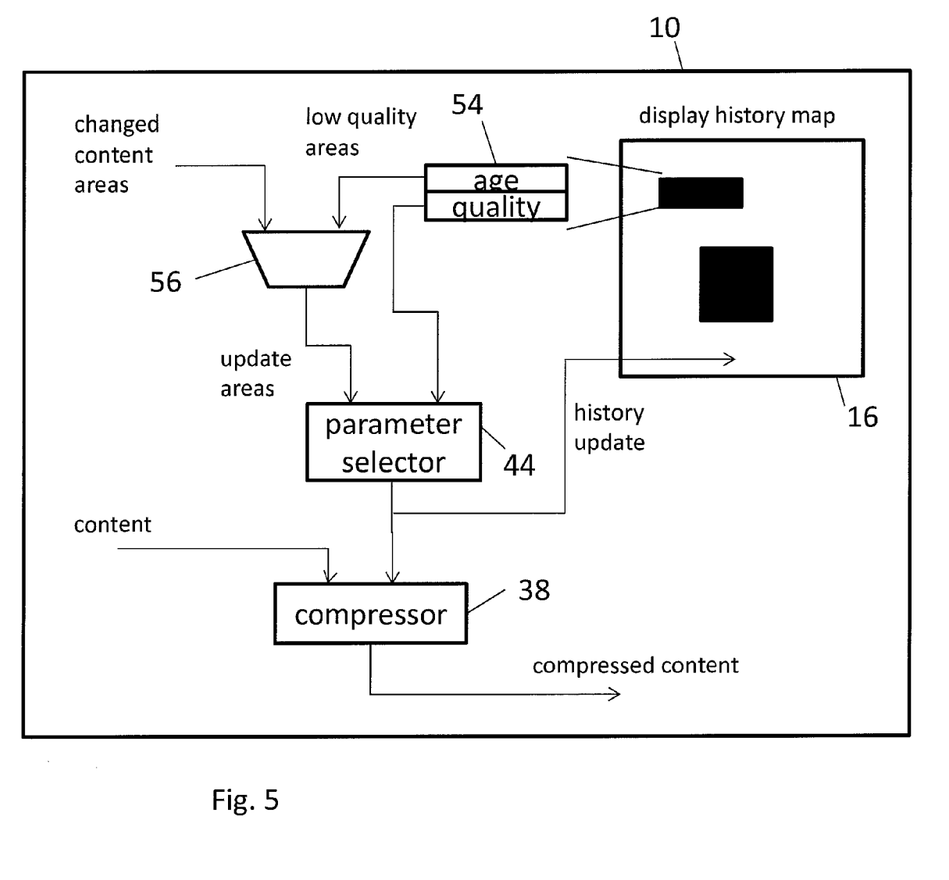
FIG. 5 shows other aspects of the processing device of FIG. 4.

FIG. 5 shows another aspect of the host device 10 in which the map 18, or a separate map, is maintained showing the various areas of the image. A listing 54 is kept for each of the areas of their age, i.e. when they were last sent and stored in the buffer memory, and their quality, i.e. the compression parameters that were used to compress the portion of display data. These parameters (age and quality) are used by the parameter selector 44 to adjust the compression parameters to improve the quality of portions of display data that were previously compressed with high compression. If a portion of display data, for example, was previously sent with low quality, then, when the area corresponding to that portion next needs to be resent, it would be desirable, perhaps subject to the constraints described above, to select compression parameters that provide a higher quality, so that the area of the image may be considered to be "healed". A multiplexer/comparator 56 receives information as to which areas of the image have changed for which portions of display data are to be compressed and sent to the display control device. The multiplexer/comparator 56 can then determine whether the corresponding portion of display data previously sent was of low quality, or is of more than a predetermined age, and can then instruct the parameter selector to select compression parameters to compress that portion with a higher quality.

Figure 6:
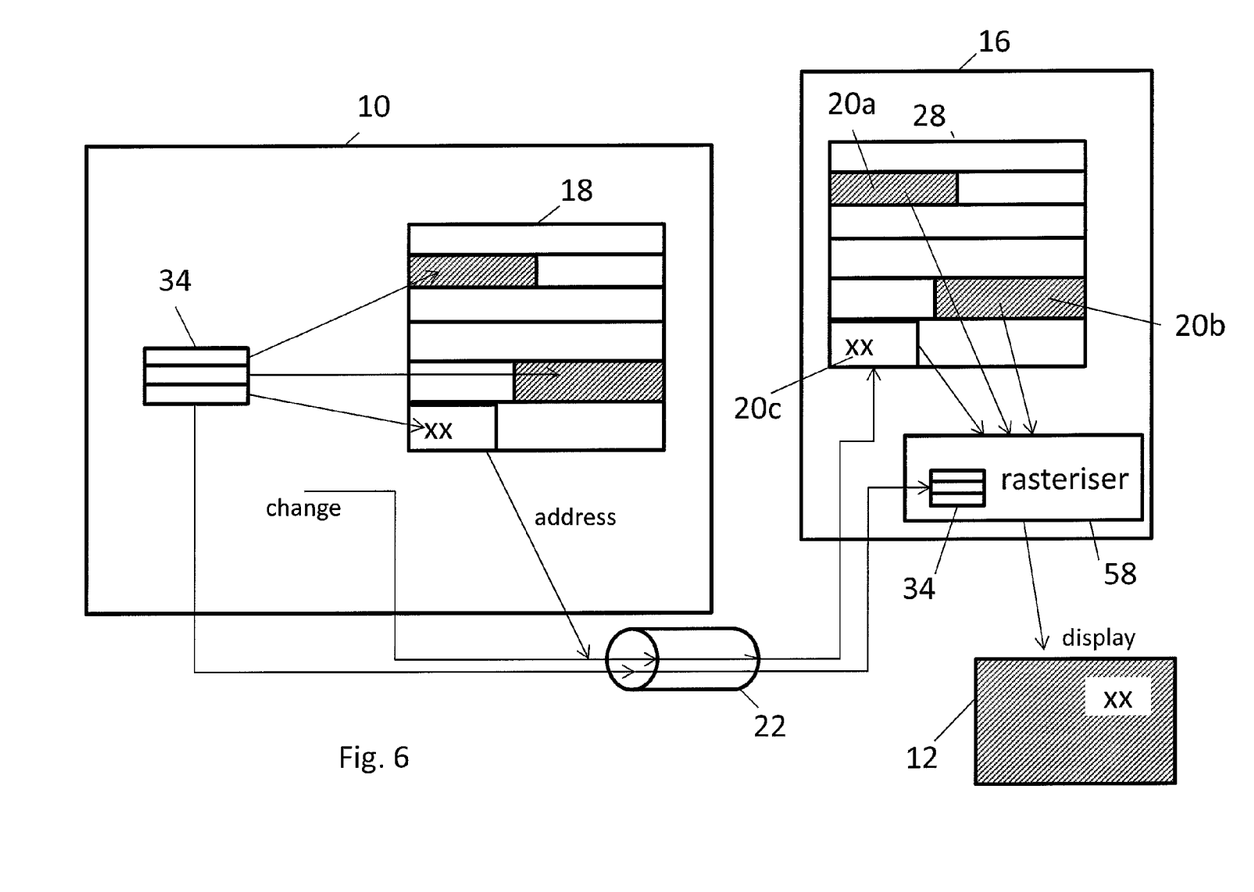
FIG. 6 shows other aspects of the buffer memory management system of FIG. 3.

Alternatively or additionally, the multiplexer/comparator 56 may be used to receive information regarding when resources may be available. When resources are available, the multiplexor/comparator 56 can select a particular portion of display data that was previously sent in low quality, or is of more than a predetermined age and insert it into the queue for (re)compression at a higher quality (lower compression) to be (re)sent to the display control device to "heal" the image. The resources that may be available may be resources at the host device for compressing the portions of display data, resources at the display control device for receiving the compressed portions of display data, and/or resources at the transport mechanism for transporting the compressed portions of display data from the host device to the display control device. It may be that when no or little new data is required to be sent, then more and more of the image can be healed in this way by sending through higher quality portions of data than were previously sent. FIG. 6 shows an embodiment of the system, similar to FIG. 3, in which portion 20c of compressed data stored in the frame buffer 28 is only a partial update of the portion of information for that area of the image. As will be apparent, if an area of the image is generally very similar to the same area in the previous frame, with just a small change (designated by "XX"), then a partial update providing only that small change and otherwise indicating that the rest of the area remains the same as before. This can reduce the amount of data, that needs to be sent from the processing device 10 to the display control device 16. The partial update is, of course indicated in the map 18 and the display list 34. The display list 34 is, as previously explained sent to the display control device 16, where it is used by the rasteriser 58 to appropriately access the data from the frame buffer and generate the raster image, with the changed portion XX to the display 12.

Figure 7:
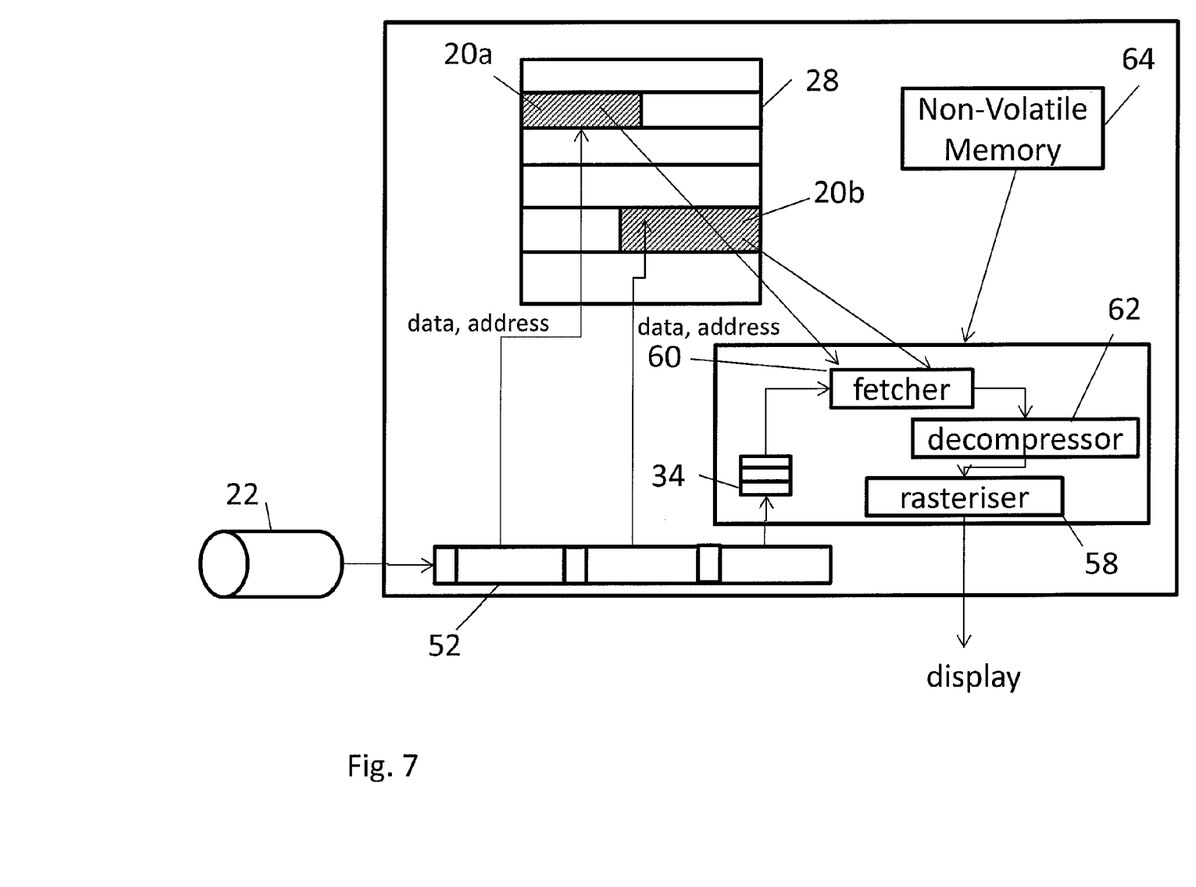
FIG. 7 shows other aspects of the display control device of FIG. 2.

FIG. 7 shows an alternative embodiment of the display control device 16. As shown, the data stream 52, such as that produced by the processing host device of FIG. 3, is received via the transport mechanism 22 and the data portions, which in this embodiment are compressed, are stored in the frame buffer 28 according to the addresses sent with the data portions in the data stream 52 from the host device. The display list 34 indicates the order in which the display portions are to be displayed to a fetcher 60, which fetches the compressed portions 20a and 20b of display data from the appropriate locations in the frame buffer 28 in the order provided by the display list 34. The compressed portions 20a and 20b of display data are then passed to a decompressor 62, which decompresses them, and passes them to the rasteriser 58 to produce the rasterised image for display.

In a preferred embodiment, the display control device 15 further includes a non-volatile programmable memory 64 for storing compressed image data in the same format as the compressed display data in frame buffer 28. The compressed image data can be start-up splash image or some other image that is pre-programmed into the memory 64 so that when the display control device is not operating to display data from the frame buffer 28, for example at start-up or when the host device has been disconnected from the display control device, the display control device can decompress the compressed image data for rasterising for output to the display in the same way as it would otherwise decompress the display data from the frame buffer 28. Although several embodiments have been described in detail above, it will be appreciated that various changes, modifications and improvements can be made by a person skilled in the art without departing from the scope of the present invention as defined in the claims.

The invention claimed is:

1. A method, at a host device, of managing variable size memory of a display control device connectable to the host device, the memory being used for storing display data sent from the host device to the display control device for displaying on one or more displays, the method comprising:
   maintaining a map at the host device corresponding to the memory of the display control device, the map indicating locations corresponding to addresses of the memory at which data is stored or not;
   determining a size of a portion of the display data using compression parameters associated with the portion of the display data, the size being variable for different portions of data depending on the compression parameters;
   determining a location on the map where the portion of display data would fit into the memory so as to maximize packing efficiency based on the compression parameters, wherein said location on the map corresponds to a smallest free space into which the portion of the display data can fit based on the compression parameters;

sending, to the display control device, an address in the memory corresponding to the determined location on the map, together with the portion of display data; and
updating the location on the map corresponding to the address in the memory to indicate that the address has data stored in it.

2. A method according to claim 1, further comprising the host device sending to the display control device information regarding an order in which the portions of display data in the memory are to be accessed from the memory and combined to display an image on the display.

3. A method according to claim 1, further comprising determining free space available in the memory based on the map.

4. A method according to claim 1, further comprising compressing a portion of a frame of display data using compression parameters.

5. A method according to claim 4, further comprising selecting the compression parameters so that the compressed portion of display data will fit into a free space in the memory of the display control device.

6. A method according to claim 4, further comprising:
selecting compression parameters so that the compressed portion of display data has an optimum quality.

7. A method, at a host device, of managing memory of a display control device connectable to the host device, the memory being used for storing compressed display data parts of an image sent from the host device to the display control device, wherein the display control device decompresses the compressed display data from the memory for displaying on a display, the method comprising, the method comprising:
determining free space available in the memory;
selecting compression parameters so that a compressed portion of display data will fit into a free space in the memory of the display control device and so as to maximize packing efficiency based on the compression parameters, wherein said location on the map corresponds to a smallest free space into which the portion of the display data can fit based on the compression parameters;
compressing a predetermined portion of a frame of display data;
sending, to the display control device, an address in the memory corresponding to the determined free space in the memory, together with the compressed portion of display data;
sending, to the display control device, information regarding an order in which the portions of compressed display data in the memory are to be decompressed and combined to display the image on the display.

8. A method according to claim 7, further comprising determining whether a frame buffer memory of the display control device is expected to run out of space before all the display data of a current frame is compressed and sent, and if it is determined that the frame buffer memory of the display control device is expected to run out of space before all the display data of a current frame is compressed and sent, selecting different compression parameters in order to increase the compression of the display data so that all remaining compressed display data of the current frame will fit into the frame buffer memory.

9. A method according to claim 7, further comprising maintaining a map at the host device corresponding to the memory of the display control device, the map indicating locations corresponding to addresses of the memory at which data is stored or not.

10. A method, at a host device, of managing a memory of a display control device connectable to the host device, the memory being used for storing compressed display data forming parts of an image sent from the host device to the display control device, wherein the display control device decompresses the compressed data from the memory for displaying on a display, the method comprising:
determining free space available in the memory;
determining whether the memory is expected to run out of space before all the display data of a current frame is compressed and sent;
selecting compression parameters so that all remaining compressed display data of the current frame will fit into the memory and so as to maximize packing efficiency based on the compression parameters, wherein said free space in the memory of the display control device corresponds to a smallest free space in the memory of the display control device into which the portion of the display data can fit based on the compression parameters;
compressing a predetermined portion of a frame of display data using the compression parameters;
sending, to the display control device, the compressed portion of display data; and
sending, to the display control device, information regarding an order in which the portions of compressed display data in the memory are to be decompressed and combined to display the image on the display.

11. A method according to claim 10, further comprising maintaining a map at the host device corresponding to the memory of the display control device, the map indicating locations corresponding to addresses of the memory at which data is stored or not.

12. A method according to claim 11, wherein determining free space available in the memory comprises determining a location on the map where the compressed portion of display data would fit into the memory.

13. A method, at a host device, of managing a random access memory of a display control device connectable to the host device, the memory being used for storing compressed display data sent from the host device to the display control device, wherein the display control device decompresses the compressed data from the memory for displaying on a display, the method comprising:
selecting compression parameters so that a frame of display data has an optimum quality when it has been compressed that can be sent from the host device based on resources available to transmit the compressed data to the display control device and so as to maximize packing efficiency based on the compression parameters by determining a smallest free space in the memory of the display control device into which the portion of the display data can fit based on the compression parameters;
compressing the predetermined portion of display data using the selected compression parameters; and
sending the compressed portion of display data to the display control device.

14. A method, at a host device, of managing a memory of a display control device connectable to the host device, the memory being used for storing compressed display data sent from the host device to the display control device, wherein the display control device decompresses the compressed data from the memory for displaying on a display, the method comprising:
selecting compression parameters so that a frame of display data has an optimum quality when it has been compressed that can be sent from the host computing device in a target time and so as to maximize packing efficiency based on the compression parameters by determining a smallest free space in the memory of the display control device into which the portion of the display data can fit based on the compression parameters;

compressing the predetermined portion of display data using the selected compression parameters;

sending the compressed portion of display data to the display control device.

15. A method, at a host device, of managing a memory of a display control device connectable to the host device, the memory being used for storing compressed display data sent from the host device to the display control device, wherein the display control device decompresses the compressed data from the memory for displaying on a display, the method comprising:

selecting compression parameters so that a portion of a frame of compressed data can be sent from the host device in a target time and so as to maximize packing efficiency based on the compression parameters by determining a smallest free space in the memory of the display control device into which the portion of the display data can fit based on the compression parameters;

compressing the predetermined portion of display data using the selected compression parameters;

sending the compressed portion of display data to the display control device.

16. A method, at a host device, of managing a memory of a display control device connectable to the host device, the memory being used for storing compressed display data sent from the host device to the display control device, wherein the display control device decompresses the compressed data from the memory for displaying on a display, the method comprising:

maintaining a map at the host device corresponding to a frame buffer memory of the display control device, the map indicating quality of portions of the display data stored at particular addresses in the memory;

determining whether the quality of a compressed portion of the display data previously sent to the display control device was of low quality;

determining that resources are available to transmit the compressed portion of display data to the display control device in a higher quality;

selecting compression parameters so that the portion of the display data is of higher quality when it has been compressed;

compressing the portion of display data using the selected compression parameters;

sending the compressed portion of display data to the display control device so as to maximize packing efficiency based on the compression parameters by determining an address in the frame buffer memory corresponding to a smallest free space into which the portion of the display data can fit based on the compression parameters; and updating the quality on the map corresponding to the address in the frame buffer memory where the portion of compressed display data having higher quality is stored.

17. A method according to claim 16, wherein the resources comprise any one or more of:

resources at the host device for compressing the portions of display data;

resources at the display control device for receiving the compressed portions of display data; and resources at the transport mechanism for transporting the compressed portions of display data from the host device to the display control device.

18. A method, at a display control device connectable to a host device, of storing display data sent from the host device to the display control device in a memory for displaying on a display, the method comprising:

receiving a portion of display data together with an address;

storing the portion of display data at the address in the memory so as to maximize packing efficiency based on compression parameters by using a smallest free space in the memory into which the portion of the display data can fit based on the compression parameters;

receiving information regarding an order in which the portions of display data in the memory are to be accessed from the memory and combined to display an image on the display;

accessing the portions of display data from the memory; and combining the accessed portions of display data to form an image for display.

19. A method according to claim 18, wherein the memory comprises a frame buffer memory for storing one or more frames of image data.

20. A method according to claim 18, wherein the portion of display data comprises a partial update of the display data including only the display data that has changed from any previous frame.

21. The method according to claim 18, further comprising determining free space available in the memory, and sending feedback indicative of the available free space to the host device.

22. A display control device configured to perform a method according to claim 18.

23. A host device configured to perform a method according to claim 1.

24. A tangible, non-transitory computer readable medium including executable instructions which, when executed in a processing system, cause the processing system to perform a method according to claim 1.

* * * * *